United States Patent
Kuwajima et al.

(10) Patent No.: US 7,170,717 B2
(45) Date of Patent: Jan. 30, 2007

(54) HEAD SUSPENSION ASSEMBLY AND DISK DRIVE USING THE SAME

(75) Inventors: Hideki Kuwajima, Kyoto (JP); Zhisheng Deng, Moriguchi (JP); Hideyuki Hashi, Kadoma (JP); Mitsuhisa Yoshimura, Neyagawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 355 days.

(21) Appl. No.: 10/637,812

(22) Filed: Aug. 8, 2003

(65) Prior Publication Data

US 2004/0057159 A1     Mar. 25, 2004

(30) Foreign Application Priority Data

Aug. 8, 2002    (JP)    ............... 2002-231383
Mar. 19, 2003   (JP)    ............... 2003-075703

(51) Int. Cl.
*G11B 21/21*    (2006.01)
*G11B 21/16*    (2006.01)

(52) U.S. Cl. ............... 360/244.8; 360/244.2; 360/245.6

(58) Field of Classification Search ............ 360/244.8, 360/244.2, 245.6
See application file for complete search history.

(56) References Cited

U.S. PATENT DOCUMENTS

| | | | | |
|---|---|---|---|---|
| 5,831,793 A | * | 11/1998 | Resh | 360/244.8 |
| 5,901,017 A | | 5/1999 | Sano et al. | 360/104 |
| 5,936,803 A | * | 8/1999 | Berding | 360/244.8 |
| 5,995,335 A | * | 11/1999 | Jurgenson et al. | 360/244.8 |
| 6,016,239 A | | 1/2000 | Mizuno et al. | 360/104 |
| 6,028,742 A | * | 2/2000 | Kazama | 360/244.8 |
| 6,141,187 A | * | 10/2000 | Wong et al. | 360/244.8 |
| 6,504,684 B1 | | 1/2003 | Danielson et al. | 360/244.8 |
| 6,532,135 B1 | * | 3/2003 | Chen et al. | 360/244.8 |
| 6,597,538 B1 | | 7/2003 | Kashima et al. | 360/244.5 |
| 6,778,362 B1 | * | 8/2004 | Davis et al. | 360/244.8 |
| 6,826,018 B2 | * | 11/2004 | Kuwajima et al. | 360/254.3 |
| D504,424 S | * | 4/2005 | Hashi et al. | D14/260 |
| 7,035,054 B2 | * | 4/2006 | Honda et al. | 360/265.9 |
| 2004/0090711 A1 | * | 5/2004 | Kuwajima et al. | 360/244.8 |

FOREIGN PATENT DOCUMENTS

EP    0-342 625 A2    11/1989

(Continued)

*Primary Examiner*—William J Klimowicz
(74) *Attorney, Agent, or Firm*—Rossi, Kimms & McDowell LLP

(57) ABSTRACT

A head suspension assembly includes (a) a slider having a head for recording into/reproducing from a record medium, mounted thereon, (b) a load beam having (i) the slider disposed via a flexure at one end, and (ii) a leaf-spring-like resilient member integrally formed therewith in the vicinity of the other end along the longitudinal centerline thereof, and (c) a carriage having a pair of pivots in contact with the load beam. The distal end of the resilient member is joined to the carriage and the resilient member has an opening (hole) in the center thereof. Because the stress occurring in the leaf-spring-like resilient member that is provided in the load beam of the head suspension assembly is reduced, the resilient member exerts sufficient urging force to the head and has high flexibility. This structure can provide a highly shock-resistant and thin head suspension assembly.

23 Claims, 10 Drawing Sheets

FOREIGN PATENT DOCUMENTS

| JP | 61273783 | A |   | 12/1986 |
| JP | 04313870 | A | * | 11/1992 |
| JP | 05242621 | A | * | 9/1993 |
| JP | 07105648 | A | * | 4/1995 |
| JP | 07235025 | A | * | 9/1995 |
| JP | 09082052 | A |   | 3/1997 |
| JP | 2000057719 | A | * | 2/2000 |
| JP | 2002083475 | A | * | 3/2002 |

\* cited by examiner (a)

(b)

HEAD SUSPENSION ASSEMBLY AND DISK DRIVE USING THE SAME

BACKGROUND OF THE INVENTION

1. Field of the Invention

The present invention relates to a head suspension assembly of a disk drive having a floating head, such as a magnetic disk drive, optical disk drive, and magneto-optical disk drive, which is used as a recoding and reproducing device for a computer or the like. The head suspension assembly supports the head to move and place the head to a target position above the data-recording surface of a record medium (simply referred to as a "disk").

2. Background Art

In a disk recording and reproducing device (hereinafter referred to as a "disk drive"), such as a hard disk drive (HDD), a head allows data to be recorded into and reproduced from the recording surface of a disk, i.e. a record medium. A HDD has a head suspension assembly. The head suspension assembly is structured to support the head so that the head floats with a predetermined clearance provided relative to the data recording surface of a record medium and (pivotally) moves radially above the record medium. A large number of proposals including these structures have been made (see the Japanese Patent Unexamined Publication No. H09-82052, for example).

Hereinafter, a description is provided of a head suspension assembly of a magnetic recoding and reproducing device, e.g. a hard disk drive (HDD), as an example of a head suspension assembly of a conventional disk drive having a floating head. The description is provided using FIG. 9, a plan view showing the structure of an essential part of the magnetic recording and reproducing device, and FIG. 10, a perspective view showing a major portion of the head suspension assembly for explanation thereof.

With reference to FIG. 9, head suspension assembly 71 is made up of load beam 72 having relatively low rigidity, leaf spring 73, carriage 74 having relatively high rigidity, slider 75 provided at one end of load beam 72 on a surface opposed to a record medium (disk), and a head (not shown) mounted on this slider 75. Load beam 72 is designed to have relatively low rigidity. The other end of load beam 72 is bent to form resilient member 73 made of a leaf spring or the like. This resilient member 73 is coupled to carriage 74. Further, carriage 74 is pivotally supported by pivotal bearing 76. Driving means 77 attached to carriage 74 allows head suspension assembly 71 to pivotally move in a direction parallel to the surface of record medium 78 in a predetermined range of angles. Head suspension assembly 71, pivotal bearing 76, and driving means 77 constitute head driving mechanism 70.

Record medium 78 is rotated by rotating means 79 at a predetermined speed. When a magnetic recoding and reproducing device records or reproduces data, the balance of floating force caused by airflow resulting from rotation of record medium 78 and force of urging slider 75 toward the surface of record medium 78 causes slider 75 to float with a certain floating amount. The head records and reproduces data while it floats with the certain floating amount. The force of urging slider 75 toward the surface of record medium 78 is exerted mainly by leaf spring 73 of head suspension assembly 71.

In other words, in recording and reproduction of data, driving means 77 provided in carriage 74 moves head suspension assembly 71 pivotally around pivotal bearing 76. Thus, the head mounted on slider 75 is positioned above a specific track while floating above the surface of record medium 78 with a certain floating amount for recording and reproduction of data.

A further description is provided of the structure and operation of head suspension assembly 71, with reference to FIG. 10. FIG. 10 is a perspective view of a major portion of head suspension assembly 71 of FIG. 9 having a magnetic head.

With reference to FIG. 10, a magnetic head (not shown) is provided on slider 75 opposed to a magnetic record medium (not shown). Slider 75 is provided on the bottom face of one end of load beam 72. On the other hand, the other end of load beam 72 is bent to form leaf spring 73. Leaf spring 73 is engaged with carriage 74. In order to prevent changes in the load of slider 75 imposed on a magnetic record medium that are caused by vertical movements (e.g. side-runout) of the magnetic record medium and variations in the distance between the slider and the magnetic record medium caused by mass production, leaf spring 73 has cut-out opening 80. The cut-out opening reduces the rigidity and spring constant of leaf spring 73 and renders leaf spring 73 flexible.

In such a head suspension assembly, even when vertical movements of a disk, i.e. a record medium, occur in recording into and reproduction from the disk, displacement of a head from a specific track position on the disk, which is called off-track, is prevented by stable floating of the slider. Additionally, the head can sufficiently follow the vertical movements of the disk. For these purposes, the head suspension assembly is structured so that a leaf spring mainly exerts force on a slider to cause the slider to impose a predetermined load toward the disk and a load beam has flexibility. Therefore, it is required that the leaf spring ensures the force necessary to urge the slider toward the surface of a disk. On the other hand, the floating amount of the slider varies with the product. Thus, it is also required to prevent variations in the force of urging the slider toward the surface of a disk. For this purpose, as illustrated in FIG. 9, the load beam has a cut-out opening or a thin-sheet structure, which reduces the rigidity and spring constant of the spring. This structure renders a certain degree of flexibility to the head suspension assembly and accommodates variations in urging force.

However, having a load beam of a thin-sheet structure, the conventional head suspension assembly has a low frequency at the main resonance point, i.e. a low resonant frequency. As a result, an oscillation mode including a twist occurs when the head suspension assembly pivotally moves to be positioned above a specific track. It requires a certain period of time to settle this oscillation mode. As a result, it poses a problem of difficulty in reducing access time.

In the conventional head suspension assembly, the center of gravity lies in a position nearer to a portion on which the head is mounted than to the resilient member made of a leaf spring or the like. For this reason, in the slider, strong external shocks given to the magnetic recording and reproducing device will disturb the balance between the floating force caused by airflow generated by rotation of a disk, i.e. a record medium, and the force of urging the slider toward the disk. This is prone to cause phenomena, such as a jump of the slider out of the surface of the disk. Such a jump causes the slider to collide with the record medium and the record medium may have magnetic or mechanical damages.

Providing a cut-out opening or structuring as a thin sheet can reduce the rigidity and spring constant of a spring of a resilient member to accommodate variations in urging force. However, it is difficult to extend the tolerance of variations in spring constant. Additionally, there is almost no ideal design of a spring of a resilient member in which the stress of the spring occurring when the load of a slider is imposed is reduced but the pressing force of the slider can be increased.

These problems are seen in not only the magnetic recording and reproducing device, but also in another disk drive having a floating head, such as an optical disk drive and magneto-optic disk drive.

Additionally, there is a demand for size reduction, especially reduction in the thickness of a magnetic recording and reproducing device. In order to provide a thinner device, reduction in the thickness of a head suspension assembly is required.

SUMMARY OF THE INVENTION

The present invention addresses these problems and aims to provide a thin and highly shock-resistant head suspension assembly and a disk drive using the head suspension assembly. In the head suspension assembly, a spring constituting a resilient member of a load beam has high flexibility and renders sufficient urging force to a head, and the stress occurring in the spring is reduced.

In order to attain this object, according to one aspect of the present invention, there is provided a head suspension assembly including: (a) a slider having a head mounted thereon, (b) a load beam having (i) the slider disposed via a flexure at one end, and (ii) a resilient member integrally formed with the load beam along the longitudinal centerline thereof in the vicinity of the other end, and (c) a carriage having a pair of pivots in contact with the load beam and pivotally movable in a direction perpendicular to a record medium. The head suspension assembly is structured so that the distal end of the resilient member is joined to the carriage, and the resilient member has an opening in the center thereof.

According to another aspect of the present invention, there is provided a head suspension assembly including: (a) a slider having a head mounted thereon, (b) a load beam carrying the slider at one end, (c) a resilient member joining the load beam and a carriage, and (d) a bearing provided between the load beam and the carriage and pivotally movable in a direction perpendicular to a record medium. The head suspension assembly is structured so that the resilient member has narrow sections for reducing the width of the resilient member to a width smaller than that of the joint between the load beam and the carriage.

These structures can provide a head suspension assembly that is highly shock-resistant and accessible at high speeds. In the head suspension assembly, the stress occurring in a spring constituting a resilient member thereof can be made uniform, the size of a load beam is reduced without an increase in spring constant, and the weight of the spring of the resilient member can be reduced.

In accordance with one aspect of the present invention, there is provided a disk drive including: (a) a slider having a head mounted thereon, (b) a load beam carrying the slider at one end, (c) a resilient member joining the load beam and a carriage, and (d) a bearing provided between the load beam and the carriage and pivotally movable in a direction perpendicular to a record medium. The disk device is structured so that the resilient member has an opening and narrow sections for reducing the width of the resilient member to a width smaller than that of both ends thereof. In accordance with another aspect of the present invention, there is provided a disk drive including: (a) a slider having a head mounted thereon, (b) a load beam carrying the slider at one end, (c) a resilient member joining the load beam and a carriage, and (d) a bearing provided between the load beam and the carriage and pivotally movable in a direction perpendicular to a record medium. The disk drive is structured so that the length of the resilient member in the direction perpendicular to the longitudinal direction of the load beam is larger in the vicinity of one end of the load beam than in the center of the resilient member.

In addition to these structures, in accordance with another aspect of the present invention, there is provided a disk drive including: (a) a record medium, (b) a slider having a head mounted thereon, (c) a load beam carrying the slider at one end, (d) a resilient member joining the load beam and a carriage, and rendering the load beam force of urging the load beam toward the recording surface of the record medium, (e) a first bearing provided between the load beam and the carriage, and (f) an opening provided in the resilient member.

These structures can reduce the stress occurring in a spring constituting a resilient member of a load beam, and allows the spring to render sufficient urging force to a head and have high flexibility. These structures also provide a thin head suspension assembly highly shock-resistant and accessible at high speeds, and a disk drive using the head suspension assembly.

BRIEF DESCRIPTION OF THE DRAWINGS

FIG. 4A is a drawing showing how stress occurs in a resilient member having a rhombic opening formed in a center thereof.

| | |
|---|---|
| 1, 75 | Slider |
| 2 | Flexure |
| 3, 72 | Load beam |
| 4 | Centerline |
| 5, 55, 73 | Resilient member |
| 6, 74 | Carriage |
| 7 | Pivot |
| 8 | Opening (hole) |
| 9 | Coupling |
| 10 | Side reinforcement |
| 11, 71 | Head suspension assembly |
| 58 | Narrow section |
| 70 | Head driving device |
| 76 | Bearing |
| 77 | Driving means |
| 78 | Record medium (disk) |
| 79 | Rotating means |

DETAILED DESCRIPTION OF THE INVENTION

Exemplary embodiments of the present invention are demonstrated hereinafter with reference to the accompanying drawings.

First Exemplary Embodiment

Figure 1:
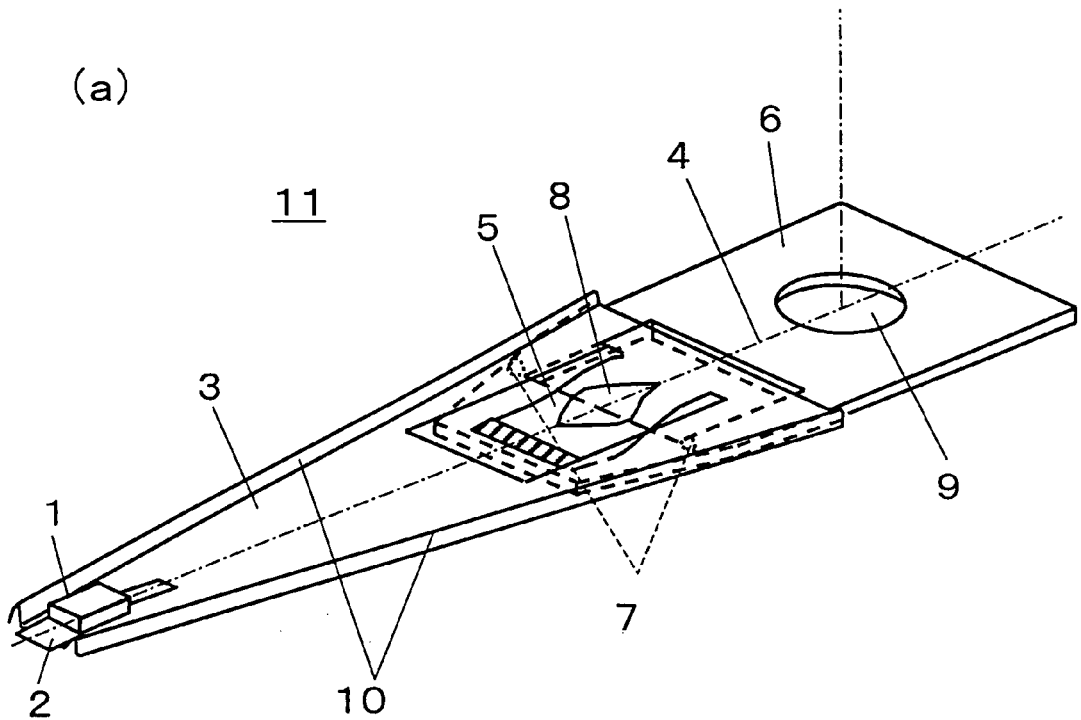
FIG. 1A is a perspective view of an essential part of a head suspension assembly in accordance with a first exemplary embodiment of the present invention, showing a structure thereof.
FIG. 1B is a plan view of a load beam portion, i.e. an essential part of the head suspension assembly in accordance with the first exemplary embodiment of the present invention.
Figure 1:
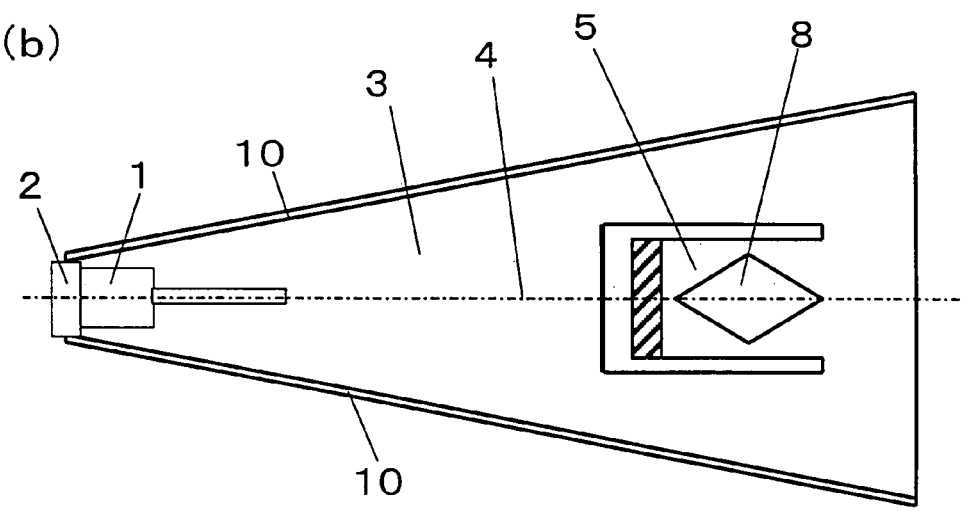
Figure 2:
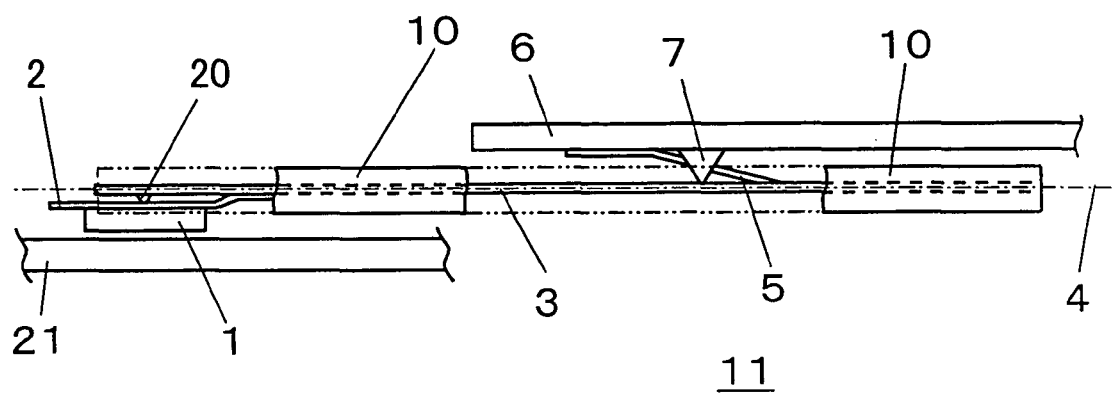
FIG. 2 is a side view showing a partial section of a major portion of a load beam of the head suspension assembly in accordance with the first exemplary embodiment of the present invention.

FIGS. 1 and 2 are drawings for illustrating a head suspension assembly in accordance with the first exemplary embodiment of the present invention. Hereinafter, a description is provided of a magnetic recording and reproducing device as an example of a disk drive. FIG. 1A is a perspective view of an essential part of a head suspension assembly having a floating head in a disk drive that is used as a storage device of a computer or the like. FIG. 1B is a plan view of a load beam portion, i.e. an essential part of the head suspension assembly. FIG. 2 is a side view showing a partial section of a major portion of the head suspension assembly. FIG. 1 does not show the elements as they are actually disposed. The assembly is tuned upside down, in order to show the shape of the essential part more clearly. FIG. 2 shows the elements as they are actually disposed.

With reference to FIGS. 1 and 2, slider 1 having a magnetic head (not shown) mounted thereon is joined to flexure 2. Flexure 2 is made of a metal thin plate of stainless steel, for example, and a flexible circuit board that are integrally formed with each other, and also serves as a gimbal. Further, flexure 2 is joined to load beam 3. The head suspension assembly is structured so that the apex of dimple 20 (not shown in FIG. 1) provided on load beam 3 (also referred to as a "suspension arm" or "suspension") is in contact with flexure 2 and slider 1 joined to flexure 2 can move freely around the apex of dimple 20. In load beam 3, tongue-shaped resilient member 5 like a leaf spring is formed by cutting a part of load beam 3 in the vicinity of longitudinal centerline 4 thereof. One end of this tongue-shaped resilient member 5 like a leaf spring is joined to carriage 6 by a known method, such as spot welding, ultrasonic welding, and laser welding.

Resilient member 5 like a leaf spring can be formed using a separate member different from load beam 3. When a separate member is used, one end of the separate member for forming tongue-shaped resilient member 5 is joined to load beam 3 and the other end thereof to carriage 6. Carriage 6 has two pivots 7 in positions bilaterally symmetrical with respect to longitudinal centerline 4 of load beam 3. The respective apexes of these two pivots 7 are in contact with load beam 3. Therefore, the head suspension assembly is structured so that load beam 3 rocks on fulcrums of the respective apexes of two pivots 7 provided on carriage 6, against the resilient force of leaf-spring-like resilient member 5 of load beam 3 joined to carriage 6. Slider 1 joined to load beam 3 is urged toward a record medium (not shown) so as to press the surface of the record medium. In other words, a first bearing that allows load beam 3 to pivotally move (rock) on a supporting axis, i.e. the line connecting the respective apexes of these two pivots 7, is structured. Further, formed at the other end of carriage 6 is coupling 9 for coupling to a driving means holder (not shown). Slider 1 having a magnetic head mounted thereon, flexure 2, load beam 3 having leaf-spring-like resilient member 5, and carriage 6 constitute head suspension assembly 11.

Resilient member 5 is formed by cutting a part of load beam 3 in the vicinity of longitudinal centerline 4 thereof symmetrically with respect to centerline 4. Each of the right and left side faces of load beam 3 is formed continuously along substantially the entire region in the longitudinal direction thereof. Therefore, side reinforcement 10 can be provided by bending, along the entire region on each of the right and left side faces of load beam 3. Providing side reinforcements 10 on load beam 3 can considerably increase the rigidity and the resonance frequency of load beam 3, from approx. 2 kHz, which a conventional head suspension assembly has, to approx. 10 kHz. This can considerably increase the rocking speed of head suspension assembly 11, and thus the access speed thereof.

Carriage 6 and the driving means holder (not shown in FIGS. 1 and 2) are coupled by coupler 9. As described later, a disk drive is structured to have a pivotal bearing, i.e. a second bearing (not shown in FIGS. 1 and 2), and driving means, such as a voice coil motor, disposed opposite to carriage 6 with respect to the pivotal bearing. Head suspension assembly 11 and the driving means holder constitute a head suspension mechanism. With this structure, the length of the arm of either carriage 6 of head suspension assembly 11 or the driving means holder can be changed to accommodate to various sizes of record media. Thus, this structure is practical in production of a standardized magnetic recording and reproducing device accommodating to various sizes and kinds of record media.

The pressing force of slider 1 exerted on the surface of a record medium can be set arbitrarily, depending on the material and thickness of leaf-spring-like resilient member 5, the height of respective two pivots 7, and the position of the joint between load beam 3 and resilient member 5. For example, thick leaf-spring-like resilient member 5 formed with rigid material can exert large urging force. Alternatively, large urging force can be exerted by increasing the height of apexes of two pivots 7. The stress generated in resilient member 5 by pressing force can be reduced by changing the shape of resilient member 5. In the first exemplary embodiment of the present invention, a rhombic opening, i.e. a hole, is formed to reduce the stress occurring in the spring.

Figure 3:
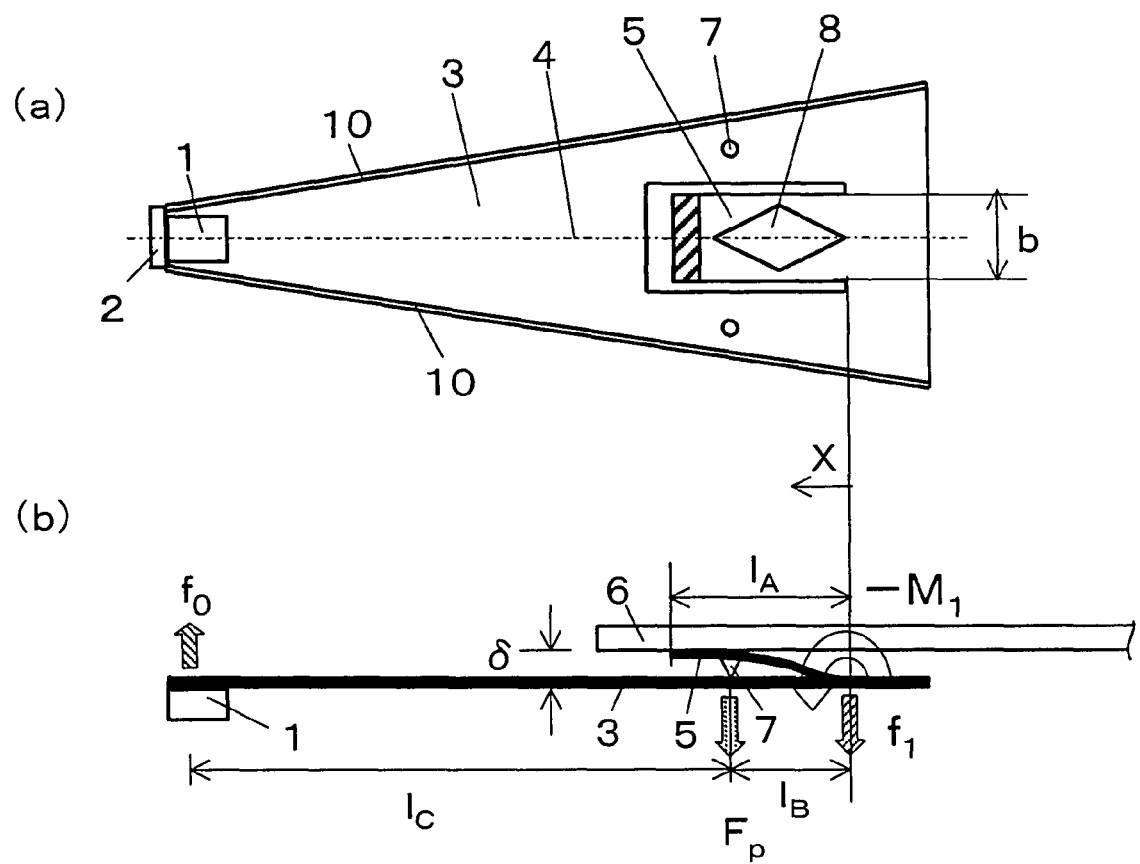
FIG. 3A is a plan view of the load beam portion, i.e. an essential part of the head suspension assembly in accordance with the first exemplary embodiment of the present invention.
FIG. 3B is a sectional view of the load beam and a resilient member taken along a centerline of the load beam portion in accordance with the first exemplary embodiment of the present invention.
Figure 4:
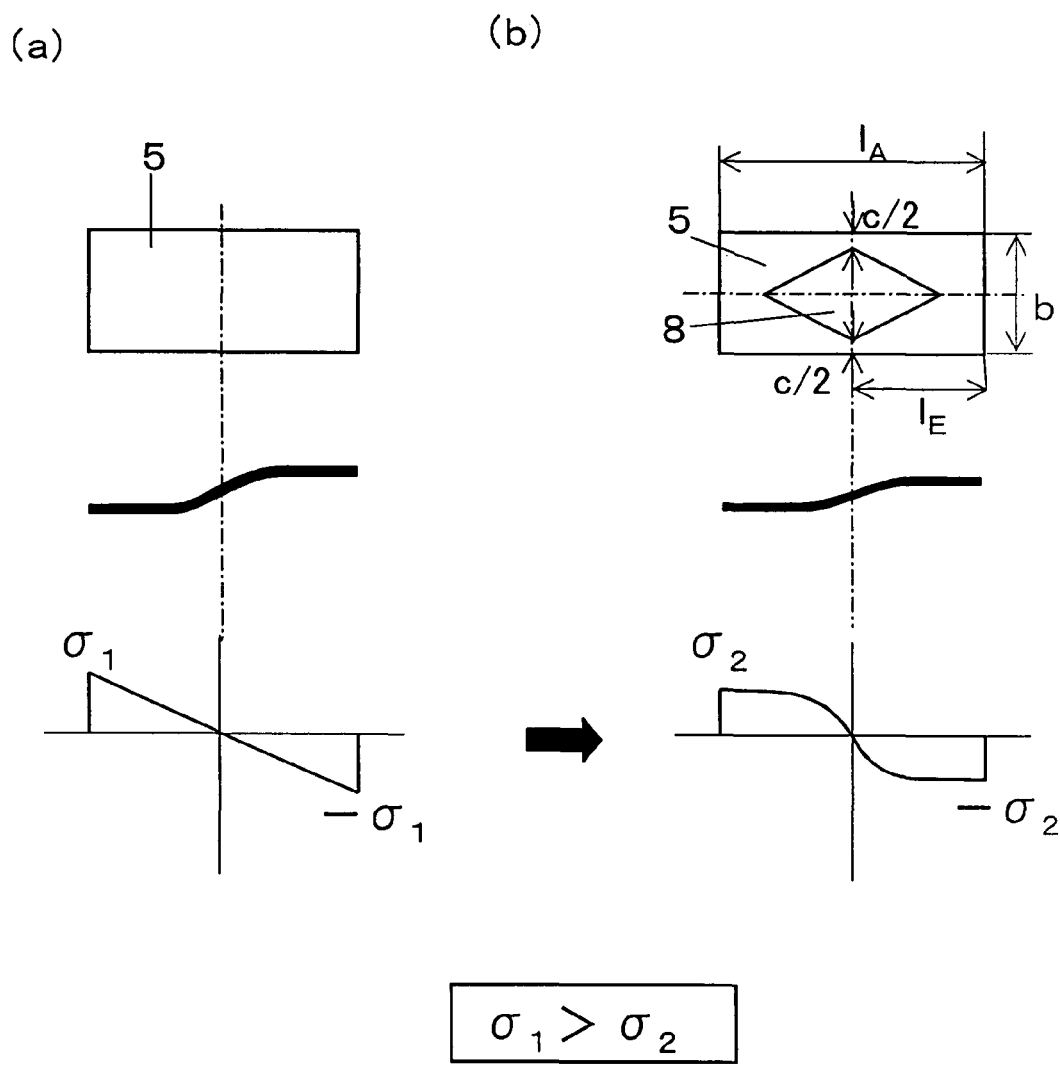
FIG. 4A is a drawing showing how stress occurs in a resilient member having no opening formed therein.

Next, a description is provided of stress occurring in leaf-spring-like resilient member 5 having an opening (hole)

symmetrical with respect to centerline 4, with reference to FIGS. 3 and 4. FIG. 3A is a plan view showing a load beam portion, i.e. an essential part of head suspension assembly 11 shown in FIG. 1B. As for FIG. 3B, thick arrows schematically show load force f0 on slider 1 disposed in a position spaced by arm length lc from the line connecting two pivots 7, pivot pressing force Fp on pivots 7, and counter-clockwise moment −M1 entirely on resilient member 5 that are exerted when vertical force f1 is exerted on leaf-spring-like resilient member 5, in a sectional view of load beam 3 and resilient member 5 taken along centerline 4 of the load beam portion.

FIG. 4A shows how stress occurs in a leaf-spring-like resilient member having no opening (hole). At this time, as shown in the lower part of the drawing, in the distribution of bending stress occurring in the spring, the bending stress is largest (σ1) at both ends and is zero at the center. In order to optimize the ability of resilient member 5 to generate load, it is necessary to make the occurring stress uniform. Now, as shown in FIG. 4B, rhombic opening 8 is formed in the center of resilient member 5. In the distribution of stress occurring in such a resilient member, bending stress σ2 at both ends gently continues toward the center. Thus, the bending stress distribution is made uniform. Because σ1>σ2, it is considered that the spring constant of a spring having an opening is smaller than that of a spring having no opening.

In this case, the stress distribution of leaf-spring-like resilient member 5 can theoretically be calculated using strain energy and the shape of the spring. The stress distribution is expressed by the following Equations 1 and 2.

When $0 < x \leq l_E$, $$\sigma = \frac{M}{I}\frac{h}{2} = \frac{6(-M_1 + f_1 x)}{bh^2\left(1 - \frac{1-n}{rl_A}x\right)} \quad \text{(Equation 1)}$$

When $l_E < x < l_A$, $$\sigma = \frac{M}{I}\frac{h}{2} = \frac{6(-M_1 + f_1 x)(r-1)l_A}{h^2\{(n-1)bx - nbl_A + brl_A\}} \quad \text{(Equation 2)}$$

In the Equations, h is the thickness of leaf-spring-like resilient member 5, I is the moment of inertia of a cross section at the right end of resilient member 5, $f_1$ is the vertical force on the resilient member (the load force exerted on the slider being $f_0$), n is the closure ratio, i.e. the rate of area other than rhombic opening 8 (n=b/c, where b is the width of the spring and c is the result of subtraction of the maximum width of the opening from the width of the spring), r is the ratio of the distance between the starting point of the spring and the center of opening 8 to the length of resilient member 5 ($r=l_E/l_A$), and m is the ratio of the distance between the starting point of the spring and the position of pivots to the length of resilient member ($m=l_B/l_A$).

Spring constant K is expressed by Equation 3 as follows:

$$K = \frac{1}{l_C^2}\left[\left(ml_A + \frac{A}{B}\right)\frac{B}{BC - DA}\left(ml_A + \frac{D}{B}\right) + \frac{1}{B}\right] \quad \text{Equation 3}$$

where $$A = \frac{l_A^2}{EI}\left[\frac{r^2(\log n - n + 1)}{(n-1)^2} + \frac{(r-1)}{(n-1)}\left\{r - 1 - \frac{(r-n)\log n}{(n-1)}\right\}\right]$$

$$B = \frac{l_A \log n}{EI(n-1)}$$

$$C = \frac{l_A^3}{2EI(n-1)^2}\left[r^3\left\{n - 3 + \frac{2\log n}{(n-1)}\right\} + \frac{(r-1)^3(1-n^2)}{n-1} + 4(r-n)(r-1)^2 - \frac{2(r-1)(r-n)^2}{(n-1)}\log n\right]$$

$$D = \frac{l_A^2}{2EI}\left[\frac{2r^2}{(n-1)^2}(\log n - n + 1) + (r-1)\left\{\frac{2(r-1)}{(n-1)} - \frac{2(r-n)}{(n-1)^2}\log n\right\}\right]$$

Figure 5:
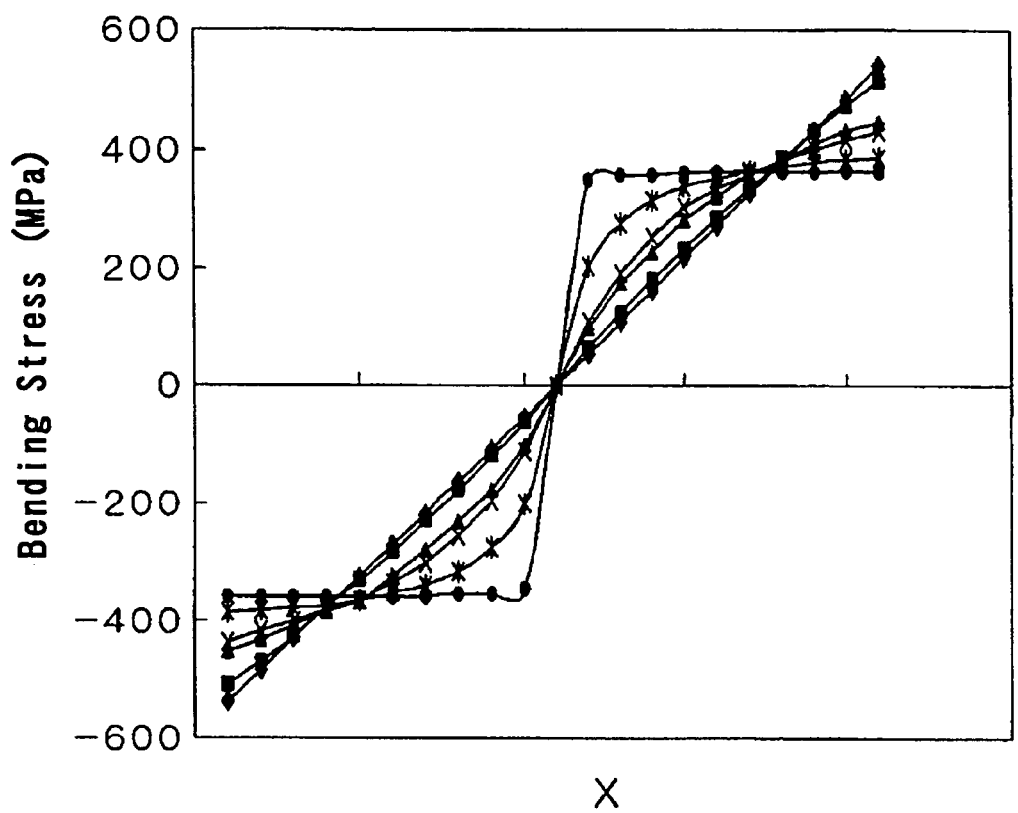
FIG. 5 is a graph showing an example of calculation results of stress distribution of a resilient member having a rhombic opening in accordance with the first exemplary embodiment of the present invention, when closure rates vary.

FIG. 5 shows actual calculation results using Equations 1 and 2 of the stress distribution of a resilient member made of SUS 304 stainless steel with a rhombic opening (thickness=40 μm, spring width=1.8 mm, load beam arm length=13 mm), when closure ratio n varies. The results show that the stress of the resilient member can be smaller and the stress distribution can be more uniform at smaller closure rate n. Therefore, providing an opening in a resilient member allows a head suspension assembly to be designed more freely. According to the relational expression of the spring constant shown by Equation 3, the spring constant takes the minimum value. This shows that the spring constant can be reduced. Additionally, because providing an opening in a resilient member can reduce the weight thereof, weight reduction of a load beam can be accomplished.

In the above description, the shape of the opening (hole) in the leaf-spring-like resilient member is bilaterally symmetrical, in which the ratio of the distance between the starting point of the spring and the center of the opening to the length of the resilient member r=0.5. However, the present invention is not limited to this example. A bilaterally asymmetrical opening can be formed. Similarly, providing such a bilaterally asymmetrical opening in a resilient member can also reduce the stress in the resilient member. Although the stress distribution is not bilaterally symmetrical, it can be made uniform at respective ends of the opening.

Additionally, in the above description, the number of openings in the resilient member of the load beam is only one in the center thereof. However, the present invention is not limited to this example and a plurality of openings can be formed in the resilient member. It is desirable to dispose the openings symmetrically with respect to the centerline of the load beam. Also for a resilient member having a plurality of openings, the stress of the resilient member can be reduced and the stress distribution thereof can be made uniform.

In the above description, the shape of the opening provided in the resilient member of the load beam is rhombic. However, the present invention is not limited to this example and the shape of an opening provided in a resilient member can be circular, elliptic, or polygonal. A resilient member having such a circular, elliptic, or polygonal opening has the same advantage: the stress of the resilient member can be reduced and the stress distribution thereof can be made uniform.

Figure 6:
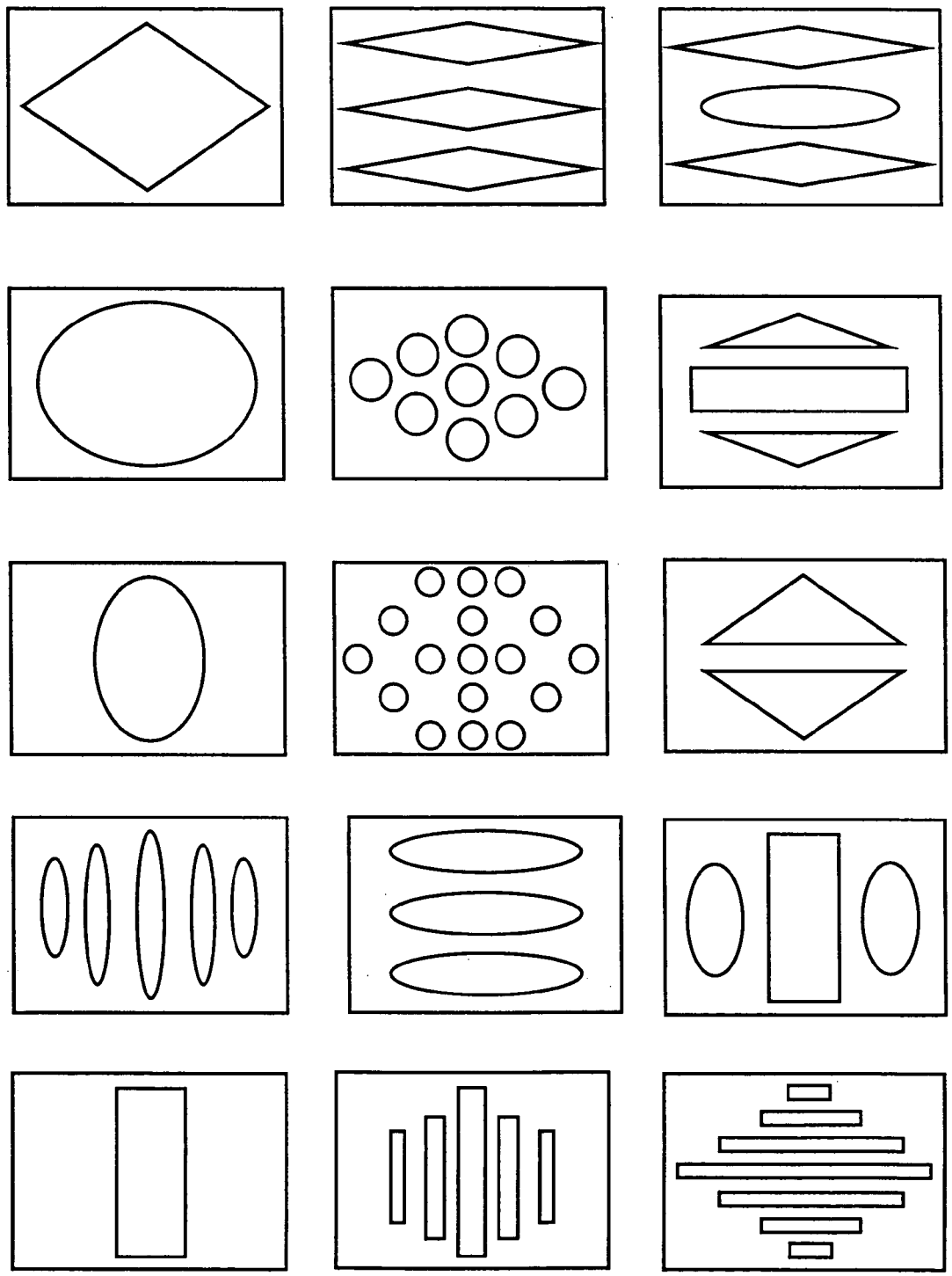
FIG. 6 shows examples of shapes of various kinds of openings provided in the resilient member of the load beam in accordance with the first exemplary embodiment of the present invention.

Further, a plurality of rhombic, circular, elliptic, and polygonal openings can be disposed in a resilient member of a load beam. A plurality of slits can also be disposed. However, in these cases, it is desirable to dispose openings or slits symmetrically with respect to the centerline of the load beam. FIG. 6B shows examples of various kinds of openings provided in a resilient member of a load beam. Other than these examples, various combinations of the number, shape, and position of openings can be used.

Second Exemplary Embodiment

Figure 7:
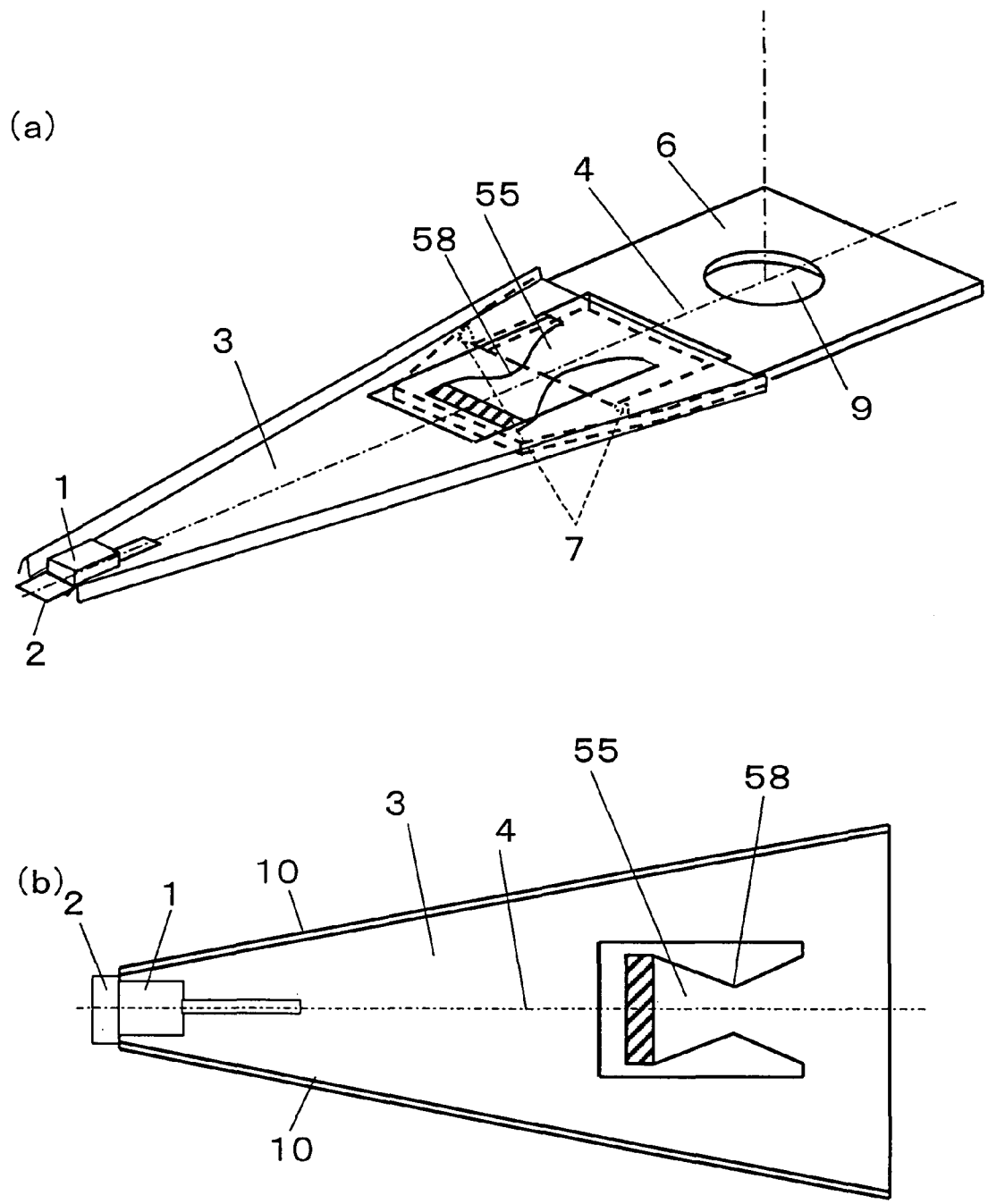
FIG. 7A is a perspective view of an essential part of a head suspension assembly in accordance with a second exemplary embodiment of the present invention, showing a structure thereof.
FIG. 7B is a plan view of a load beam portion, i.e. an essential part of the head suspension assembly in accordance with the second exemplary embodiment of the present invention.

FIG. 7 is a drawing for illustrating a head suspension assembly of the second exemplary embodiment of the present invention. FIG. 7A is a perspective view of an essential part of a head suspension assembly having a floating head in a disk drive that is used as a storage device of a computer or the like. FIG. 7B is a plan view of a load beam portion, i.e. an essential part of the head suspension assembly. FIG. 7 does not show the elements as they are actually disposed. The assembly is turned upside down in a manner similar to that of FIG. 1, in order to show the essential part more clearly.

The difference of the second exemplary embodiment from the first exemplary embodiment is the shape of leaf-spring-like resilient member 55, as obvious from FIG. 7. The load beam of the first exemplary embodiment is structure so that rectangular resilient member 5 has an opening (hole) 8. In contrast, for the load beam of the second exemplary embodiment, resilient member 55 joined to carriage 6 at one end thereof has no opening. Instead, it has two notch-like narrow sections 58 for reducing the width of the resilient member to a width smaller than that of both ends that are symmetrical with respect to centerline 4, in the center of resilient member 55. The structure of the other elements is the same as that of the head suspension assembly of the first exemplary embodiment. In FIG. 7, elements similar to those in the head suspension assembly of the first exemplary embodiment have the same reference numerals. In the second exemplary embodiment, the descriptions of the elements having the same structure as those of the head suspension assembly and the disk drive of the first exemplary embodiment are omitted for simplicity.

For the head suspension assembly of the second exemplary embodiment of the present invention, the pressing force of slider 1 exerted on the surface of a record medium can be set arbitrarily, depending on the material and thickness of leaf-spring-like resilient member 55, the height of respective two pivots 7, and the position of the joint between load beam 3 and resilient member 55. For example, thick resilient member 55 formed with rigid material can exert large urging force. Alternatively, large urging force can be exerted by increasing the height of apexes of two pivots 7. The stress generated in resilient member 55 by pressing force can be reduced by changing the shape of resilient member 55. In the second exemplary embodiment of the present invention, two notch-like narrow sections 58 for reducing the width of resilient member 55 to a width smaller than that of both ends that are symmetrical with respect to centerline 4 are formed in the center of resilient member 55, to reduce the stress occurring in the spring.

The stress occurring in leaf-spring-like resilient member 55 when two narrow sections 58 for reducing the width of resilient member 55 to a width smaller than that of both ends that are symmetrical with respect to centerline 4 are provided in the center of this resilient member can theoretically be calculated in a manner similar to that of the first exemplary embodiment. Cutting resilient member 55 of the second exemplary embodiment into two pieces along centerline 4, and placing the lower piece above the upper piece can provide a shape same as that of resilient member 5 of load beam 3 of the first exemplary embodiment. Thus, it is easily understood that the similar results can be obtained with the similar calculations. Results showing the stress distribution and the spring constant of resilient member 55 of the second exemplary embodiment can be obtained using Equations 1, 2, and 3 by changing some of the positive and negative signs. In this case, n is called a "residual rate" instead of the closure rate.

In the second exemplary embodiment, at smaller residual rate n of narrow sections 58 in leaf-spring-like resilient member 55, the stress of resilient member 55 can be smaller and the stress distribution can be more uniform. Therefore, providing narrow sections in resilient member 55 allows a head suspension assembly to be designed more freely. According to the relational expression, the spring constant takes the minimum value. Thus, the spring constant can be reduced. Additionally, because providing narrow sections in resilient member 55 can reduce the weight thereof, weight reduction of a load beam can be accomplished.

Figure 8:
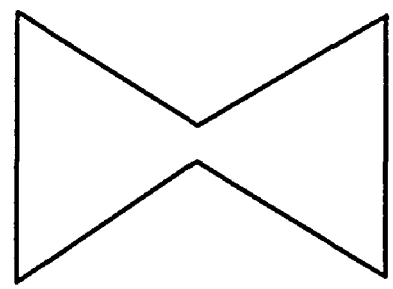
FIG. 8 shows examples of narrow sections of various shapes, and combinations of narrow sections and an opening of various shapes provided in the resilient member of the load beam in accordance with the second exemplary embodiment of the present invention.
Figure 8:
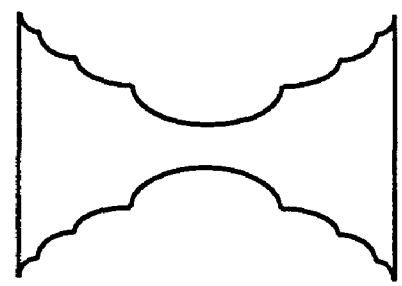
Figure 8:
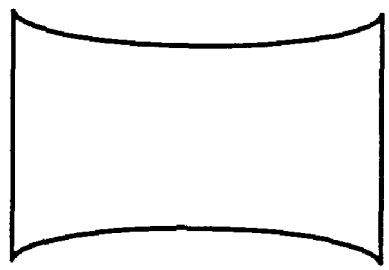
Figure 8:
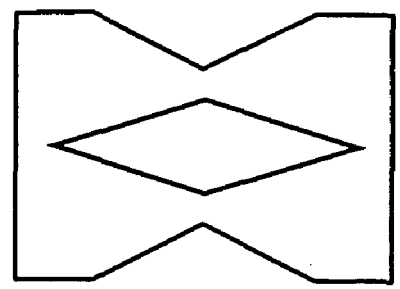
Figure 8:
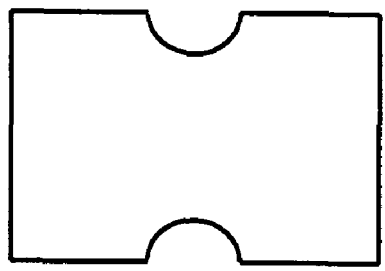
Figure 8:
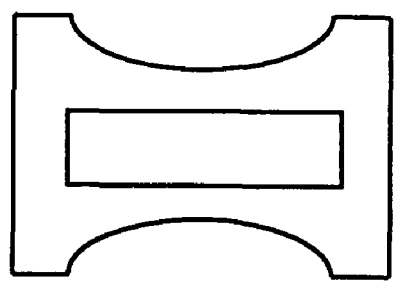
Figure 8:
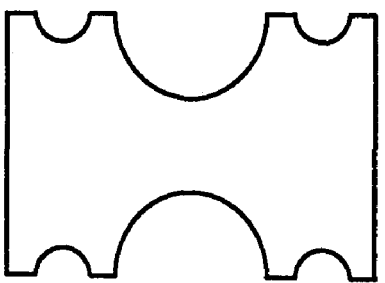
Figure 8:
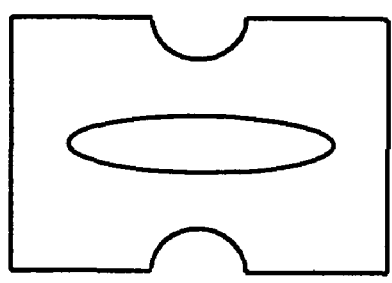
Figure 9:
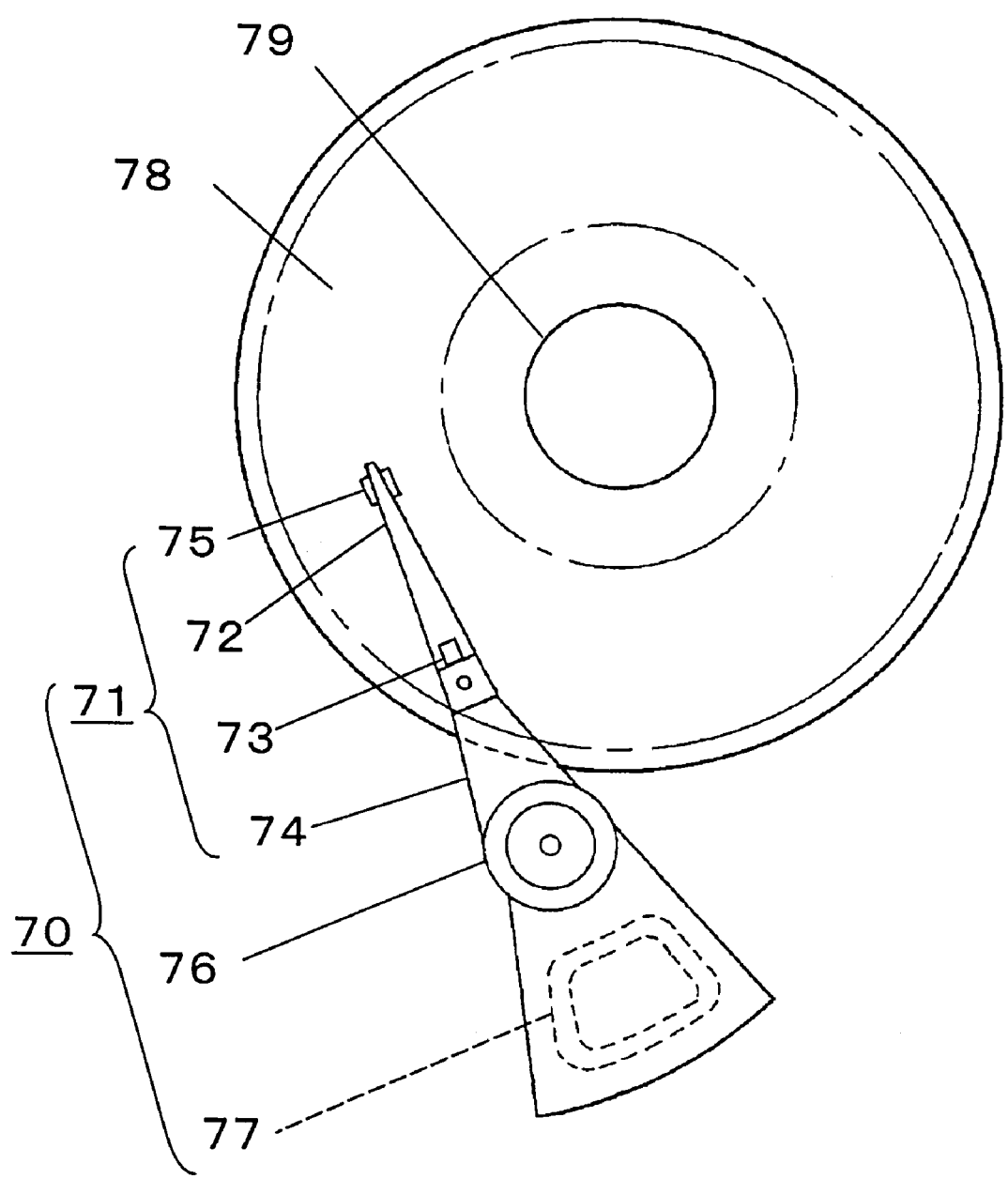
FIG. 9 is a plan view showing a structure of an essential part of a conventional disk drive.
Figure 10:
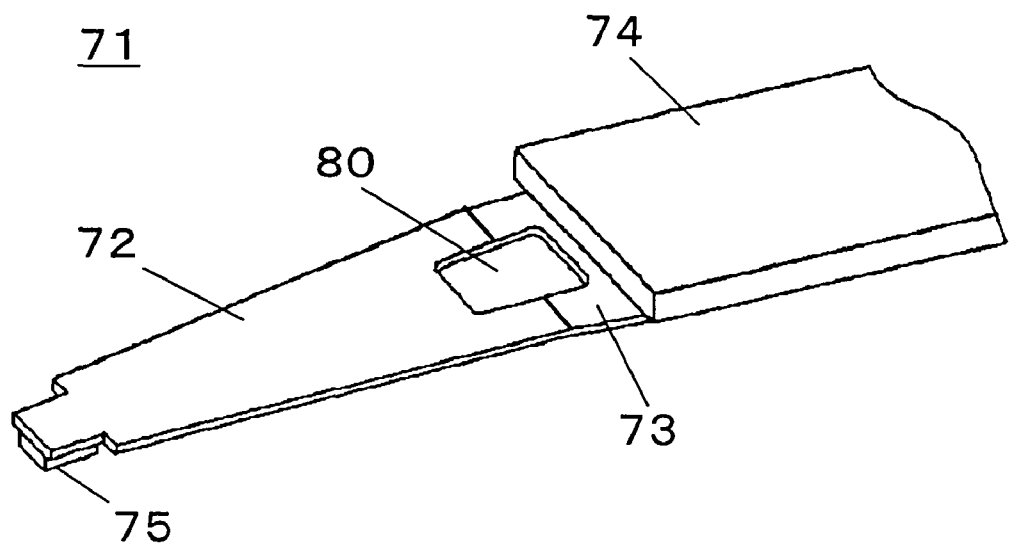
FIG. 10 is a perspective view of a major portion of the conventional head suspension assembly for illustrating a structure and operation thereof.

Shown in FIG. 7 as an example is triangular notch-like narrow sections 58 for reducing the width of resilient member 55 to a width smaller than that of both ends that are provided in the center of resilient member 55 of load beam 3. The present invention is not limited to this example. The notch can be formed by a curve of a semi-circular, semi-elliptic, or other shape instead of straight lines. Additionally, narrow sections can be formed along sides parallel to centerline 4 of resilient member 55 in combination of a plurality of notches. The shape of these narrow sections 58 can be bilaterally asymmetrical, similar to the opening of the first exemplary embodiment. A resilient member having narrow sections of a semi-circular or semi-elliptic shape instead of straight lines or combination of a plurality of notches has the same effects: the stress in the resilient member is reduced and the stress distribution is made uniform. Further, a resilient member having a combination of these narrow sections 58 and opening 8 of various kinds of shapes described in the first exemplary embodiment can also be used. FIG. 8 shows some examples of narrow sections 58 provided along the sides parallel to centerline 4 of resilient member 55 of load beam 3, and some examples of combination of narrow sections 58 and opening 8 of various kinds of shapes.

As discussed above, a head suspension assembly of the present invention is structured so that a load beam having a slider having a head mounted at one end and a carriage are joined by a leaf-spring-like resilient member, two pivots are provided on either one of the load beam or the carriage, and the pressing force of the respective apexes of the two pivots allows the load beam to pivotally move toward the surface of a record medium and to press the slider toward the surface of the record medium. Additionally, the head suspension assembly is structured so that the resilient member of the load beam has an opening and/or narrow sections. These structures have the following excellent advantages: providing a head suspension assembly that is highly shock-resistant and accessible at high speeds, making the stress occurring in the resilient member uniform, reducing the size of the load beam without increasing the spring constant, and reducing the weight of the resilient member.

Use of such a head suspension assembly has a great advantage of providing a highly reliable disk drive that is highly shock-resistant and accessible at high speeds.

In this embodiment, a description is provided of a magnetic recording and reproducing device. However, the present invention is not limited to a magnetic recording and reproducing device, and can be implemented by a disk drive, such as an optical disk drive and magneto-optical disk drive.

What is claimed is:

1. A head suspension assembly comprising:
   a head;
   a load beam carrying said head at one end thereof;
   a resilient member coupling said load beam and a carriage; and
   a pivot bearing provided between said load beam and said carriage and structured so that said load beam is movable in a direction perpendicular to a record medium, wherein said load beam rocks on fulcrums of respective apexes of two pivots provided on at least one of said carriage and said load beam against resilient force of said resilient member of said load beam joined to said carriage;
   wherein said resilient member has an opening.

2. The head suspension assembly of claim 1, wherein said opening is provided in a center of said resilient member.

3. The head suspension assembly of claim 1, wherein said opening is formed symmetrically with respect to a centerline of said load beam.

4. The head suspension assembly of claim 1, wherein said opening is formed into one of a circular shape, an elliptic shape, and a polygonal shape.

5. The head suspension assembly of claim 4, wherein said opening is formed into a rhombic shape.

6. The head suspension assembly of claim 1 or 3, wherein said opening is formed into a slit shape.

7. The head suspension assembly of claim 1, wherein at least two of said opening are formed in positions symmetrical with respect to a centerline of said load beam.

8. The head suspension assembly of claim 1, said opening is formed into a shape parallel to a centerline of said load beam and asymmetrical with respect to a line perpendicular to a line going through substantially a center of said resilient member.

9. A head suspension assembly comprising:
   a head;
   a load beam, carrying said head at one end thereof;
   a resilient member coupling said load beam and a carriage; and
   a pivot bearing provided between said load beam and said carriage and structured so that said load beam is movable in a direction perpendicular to a record medium, wherein said load beam rocks on fulcrums of respective apexes of two pivots provided on at least one of said carriage and said load beam against resilient force of said resilient member of said load beam joined to said carriage;
   wherein said resilient member has an opening and a pair of narrow sections for reducing a width of said resilient member to a width smaller than that of both ends thereof.

10. A head suspension assembly comprising:
    a head;
    a load beam carrying said head at one end thereof;
    a resilient member coupling said load beam and a carriage; and
    a pivot bearing provided between said load beam and said carriage and structured so that said load beam is movable in a direction perpendicular to a record medium, wherein said load beam rocks on fulcrums of respective apexes of two pivots provided on at least one of said carriage and said load beam against resilient force of said resilient member of said load beam joined to said carriage;
    wherein a length or said resilient member in a direction perpendicular to a longitudinal direction of said load beam is larger in a vicinity of one end of said load beam than in a center of said resilient member.

11. The head suspension assembly of any one of claims 1, 9, and 10, wherein said bearing is provided on said carriage, and a tip of said bearing is in contact with said load beam.

12. The head suspension assembly of any one of claims 1, 9, and 10, wherein said bearing is provided on said load beam, and a tip of said bearing is in contact with said carriage.

13. The head suspension assembly of an one of claims 1, 9, and 10, including a head on said slider, and a flexure for disposing said slider at one end of said load beam.

14. The head suspension assembly of any one of claims 1, 9, and 10, wherein said resilient member is integrally formed with said load beam.

15. The head suspension assembly of any one of claims 1, 9, and 10, wherein said bearing is made of two pivots provided on said carriage.

16. The head suspension assembly of claim 15, wherein said pivots are provided in positions symmetrical with respect to a longitudinal centerline of said load beam.

17. The head suspension assembly of any one of claims 1, 9, and 10, wherein said load beam is pivotally movable around said first bearing.

18. The head suspension assembly of any one of claims 1, 9, 10, and wherein said load beam includes said head in a slider and is rendered urging force by said resilient member in a direction perpendicular to a surface of said slider.

19. A disk drive comprising:
    a record medium;
    a head;
    a load beam carrying a slider at one end thereof;
    a resilient member coupling said load beam and a carriage, and rendering urging force toward a recording surface of said record medium to said load beam;
    a first bearing being a pivot bearing structured so that said load beam is movable in a direction perpendicular to a record medium, wherein said load beam rocks on fulcrums of respective apexes of two pivots provided on at least one of said carriage and said load beam against resilient force of said resilient member of said load beam joined to said carriage, and provided between said load beam and said carriage; and
    an opening provided in said resilient member.

20. The disk drive of claim 19, wherein said load beam is pivotally movable around said first bearing.

21. The disk drive of claim 19, wherein said load beam includes said head in said slider and is rendered urging force by said resilient member in a direction perpendicular to a surface of said slider.

22. The disk drive of claim 19, including a second bearing, wherein said load beam is pivotally movable in a radial direction of said record medium around said second bearing.

23. A head suspension assembly comprising:
a head;
a load beam carrying said head at one end thereof;
a resilient member coupling said load beam and a carriage; and
a pivot bearing provided between said load beam and said carriage and structured so that said load beam is movable in a direction perpendicular to a record medium, wherein said load beam rocks on fulcrums of respective apexes of two pivots provided on at least one of said carriage and said load beam against resilient force of said resilient member of said load beam joined to said carriage;
wherein said resilient member has one or both of (a) an opening, and (b) a pair of narrow sections for reducing a width of said resilient member to a width smaller than that of a joint between said load beam and said carriage.

* * * * *